April 21, 1931.                F. W. CALDWELL                1,801,486
                                PROPELLER HUB
                               Filed Jan. 18, 1926
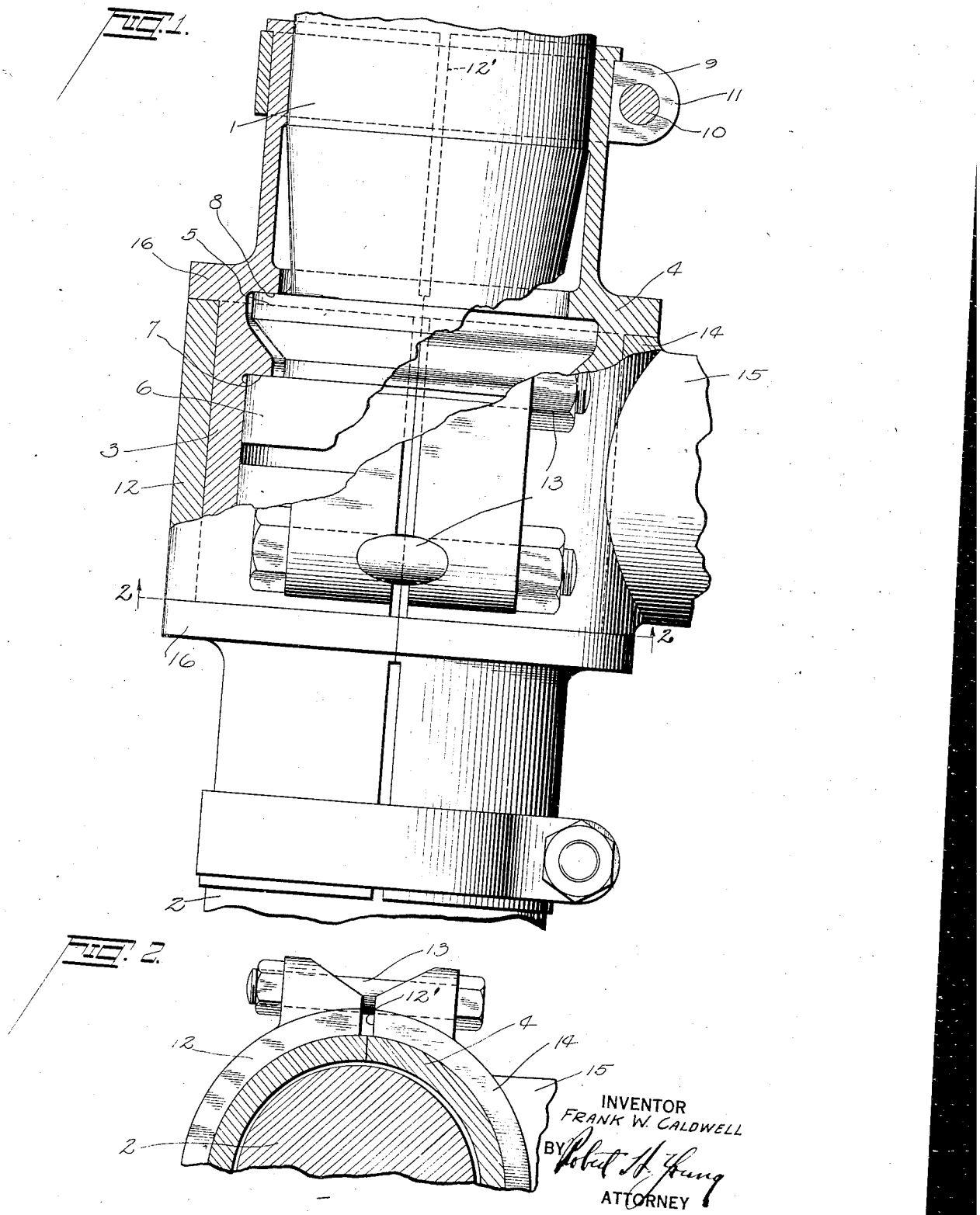
INVENTOR
FRANK W. CALDWELL
BY Robert H. Young
ATTORNEY Patented Apr. 21, 1931

1,801,486

UNITED STATES PATENT OFFICE

FRANK W. CALDWELL, OF DAYTON, OHIO, ASSIGNOR, BY MESNE ASSIGNMENTS, TO THE HAMILTON STANDARD PROPELLER CORPORATION, A CORPORATION OF PENNSYLVANIA

PROPELLER HUB

Application filed January 18, 1926. Serial No. 82,062.

This invention relates to propellers and the primary object is to provide a construction which will be easily machined and readily assembled, and which will provide for the adjustable pitch of the blades.

A further object is a provision of a split hub member divided into two halves in which the bases of the blades are clamped; these blades being held in position by means of a pair of clamp rings. The split hub member itself is held within a split holder, a part of which is rigidly connected to or integral with the crankshaft of the engine which drives the propeller. The blades are restrained against outward movement within the hub member by the provision of a flange or flanges on the bases of the blades which abut against corresponding flange grooves in the split hub member.

Further objects and advantages of my invention will be more fully set forth in the following description, in the claims and in the drawings in which—

Fig. 1 is a side elevation, partly in section of an aircraft propeller in accordance with my invention, and Fig. 2 is a section on line 2—2 of Fig. 1.

Referring more particularly to the drawings by reference numerals, the two blades 1 and 2 are mounted within the split hub member formed of halves 3 and 4. The inner end of each of the blades is provided with two flanges 5 and 6 which are neatly machined, so that they will bear against corresponding flange grooves 7 and 8, respectively, provided in the hub member. The blades are thus restrained against outward or longitudinal movement in the hub member.

Each blade is held within the hub member, so as to be mounted fixedly therein by means of a clamp ring 9, having a single bolt 10 which draws the two end ears 11 together, to thus take up slightly the space at 12' between the two halves of the hub member and prevent rotation of the blades therein.

The hub member, itself, is held in a two-piece split holder formed of a hemi-cylindrical cap 12 which is clamped by means of a pair of bolts 13 on each side of the axis of rotation of the propeller to the second hemi-cylindrical mating portion 14 which is rigidly connected to or integral with the crankshaft 15 of the engine which drives the propeller. A pair of flanges 16 extend outwardly from the split hub member, and are spaced apart the exact distance of the width of the members 12 and 14, so that the hub member and the blades mounted therein are accurately positioned properly with symmetrical reference to the axis of rotation.

While I have herein shown my invention in the form of a metal airplane propeller, it will be obvious that various other forms of the same may be employed. Furthermore, it will be obvious that, if it should be so desired, the two blades may be made integral. I am aware that various other modifications may be made within the scope of my invention, and do not intend to be limited to the precise construction which has been chosen herein for illustration.

I claim:

1. In an aircraft propeller, a split hub member of circular transverse cross section throughout comprising opposite halves, a pair of adjustable blades having bases mounted directly in said member, a pair of clamp rings, one at each end of said hub member to hold the blades from turning, and other means for holding the opposite halves of said hub member together.

2. In an aircraft propeller, a split hub member of circular transverse cross section throughout, comprising opposite halves, a pair of blades having bases mounted directly in said member for adjustment angularly therewith, a flange on the base of each blade, cooperating with a corresponding flange in said hub member, a groove in the hub member to restrain the blade against outward movement, a pair of clamp rings one at each end of said hub member to hold the blades from turning therein, and other means for holding the opposite halves of said hub member together.

3. In an aircraft propeller, a split hub member of circular transverse cross section throughout, a pair of blades having bases mounted directly in said member, flanges on the bases of the blades, cooperating with corresponding flange grooves in the hub member to restrain the blades against outward movement, a pair of clamp rings one at each end of said hub member to hold the blades from turning in the hub member, a split holder encircling a central portion of said hub member, and means for clamping the parts of the holder together.

4. In an aircraft propeller, a split hub member, a pair of blades having bases mounted directly in said member, means on the base of each blade, cooperating with complementary means in the hub member to restrain the blade against outward movement, a pair of clamp rings one at each end of said hub member to hold the blades therein, a split holder encircling the middle portion of said hub member, and means for clamping the parts of the holder together.

5. In an aircraft propeller, a split hub member, a pair of blades having bases mounted directly in said member, a flange on the base of each blade, cooperating with a corresponding flange groove in the hub member to restrain the blade against outward movement, a pair of clamp rings one at each end of said hub member to hold the blades therein, a split holder encircling said hub member, and means for clamping the parts of the holder together, one of the parts of said holder being rigidly connected to the propeller drive shaft.

6. In a propeller of the class described, a split hub member, a pair of adjustable blades having bases mounted directly in said hub member, clamping means at each end of said hub member to hold the blades therein, centrally disposed hemi-cylindrical clamping means surrounding said hub member and a driving shaft integral with a hemi-cylindrical part of said clamping means.

7. In a propeller of the class described, a split hub member, a pair of adjustable blades having bases mounted directly in said hub member, clamping means at each end of said hub member to hold the blades therein, centrally disposed split hemi-cylindrical clamping means surrounding said member, and a driving shaft integral with a hemi-cylindrical part of said centrally disposed clamping means.

In testimony whereof I affix my signature.

FRANK W. CALDWELL.